April 24, 1951 W. J. HALOSKI 2,550,556

MAGAZINE DRIVE FOR MAGNETIC WIRE RECORDERS

Filed Nov. 3, 1945

Inventor
WALTER J. HALOSKI by The Firm of Charles W. Hills Attys.

Patented Apr. 24, 1951 2,550,556

UNITED STATES PATENT OFFICE 2,550,556

MAGAZINE DRIVE FOR MAGNETIC WIRE RECORDERS

Walter J. Haloski, Chicago, Ill., assignor to Armour Research Foundation of Illinois Institute of Technology, Chicago, Ill., a corporation of Illinois Application November 3, 1945, Serial No. 626,545

1 Claim. (Cl. 242—54)

Figure 1:
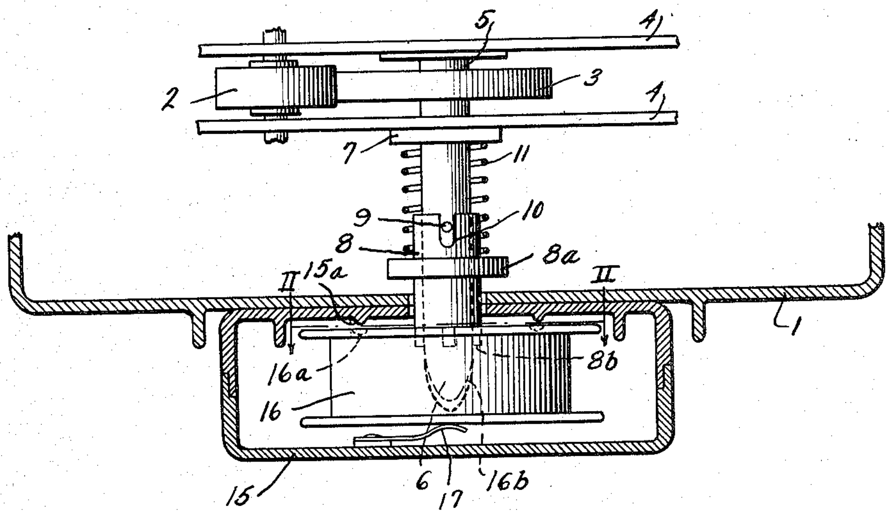

This invention relates to a magnetic wire recorder or reproducer, more specifically it relates to a magazine drive which enables quick coupling or uncoupling of magazine-enclosed, wire winding or unwinding spools with respect to the drive mechanism of a magnetic recording or reproducing device.

It is well known in the art that a wire or tape of paramagnetic material, such as stainless steel, the wire being of the order of say 0.004 inch in diameter, may have longitudinal incremental portions thereof magnetized by moving it longitudinally between two closely confronting pole faces of an electromagnet, generally referred to as a recording or reproducing head, so that if music or voice signals enter a microphone which is electrically connected to the coils of the electromagnet, a magnetic pattern will appear longitudinally of said wire corresponding exactly to such music or voice signals.

If, afterwards, the wire bearing this magnetic pattern is again fed longitudinally in the same direction to the same or a different electromagnet but which is connected, through an amplifier, to a loudspeaker instead of a microphone, the original music or voice signals will be reproduced in such loudspeaker since the varying magnetization of the wire record causes magnetic flux changes in the electromagnet inducing varying current in the coils which is then amplified and converted into sound by the loudspeaker.

A common way of first moving the wire longitudinally for recording purposes is to unwind it from a first spool onto a second spool by a suitable friction drive powered by an electric motor. After the magnetic record is made on the wire it is rewound onto the first spool from the second. After that the wire is again unwound from the first spool onto the second for the reproducing process.

It will be understood, of course, if the wire is used with only a reproducing apparatus it may be similarly rewound so that the record may be played or reproduced as often as desired.

In the past, difficulty has been experienced with the drive mechanism to effect such winding and rewinding of the wire particularly when it was desirable to substitute new spools of wires for the old ones as in the case of wanting to play a different reproduction. Furthermore difficulties have been encountered in keeping the spools accurately centered on their drive shafts because due to wear caused by high speed rotation of the shafts they would generally wear and cause wobbling of the spools.

An object of this invention is to overcome the above described difficulties inherent in common types of magnetic recorders and reproducers, more specifically to provide a simple drive mechanism of such construction as to make the spools readily attachable to or detachable from their drive shafts.

A more specific object of this invention is to provide a magazine devoid of bearings and in which one or more spools are mounted and arranged so that clamping of the magazine close to a panel enclosing a drive mechanism will cause coupling of the spools to the drive shafts and uncoupling of a braking mechanism for the spool.

A further object of the present invention is to provide a self-centering drive for a spool of a magnetic wire recorder wherein the drive shaft extends into only one side of the spool instead of extending axially through both sides thereof as is common in the art.

Figure 2:
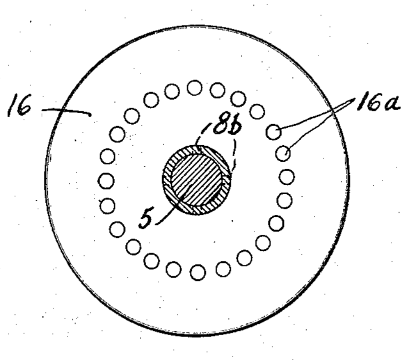

The novel features which I believe to be characteristic of my invention are set forth with particularity as to its organization, method of operation and manner of construction, together with further objects and advantages thereof, may best be understood by reference to the accompanying drawings, in which:

Fig. 1 is a longitudinal view partly in cross section of a novel magazine drive apparatus for a magnetic wire recorder or reproducer and embodying the principles of my invention, and Fig. 2 is a view taken along line 2—2 of Fig. 1.

Referring more particularly to the drawing, numeral 1 denotes a panel portion of a housing or container which encloses a drive mechanism for a magnetic wire recorder or reproducer. A friction drive wheel 2 which is driven by suitable means such as an electric motor (not shown) is moved into or out of frictional drive relationship with a friction wheel 3 by any suitable transmission means well known in the art (not shown). Friction wheel 3 is rotatably mounted on frame members 4 rigidly fixed to the housing of which panel portion 1 is a part. A drive shaft 5, having a tapered end portion 6 projecting beyond the outside surface of panel 1, is journaled on frame members 4. A collar 7 is rigidly secured to drive shaft 5.

A hollow sleeve 8 is slidably mounted telescopically with respect to drive shaft 5 and has diametrically opposite slots 9 into which projects pins 10 rigidly secured to shaft 5. A helical spring 11 having one end thereof abutting against collar 7 and the other end abutting against collar portion 8a integral with sleeve 8 normally yieldably pushes such collar portion 8a into sliding relationship with an interior surface of the panel portion so long as the magazine is removed from the panel portion 1.

A magazine 15 encloses one or more spools such as spool 16. For example, a pair of spools may be contained in the magazine so that wire is unwound from one onto the other; or perhaps a plurality of magazines each enclosing only a single spool may be provided. Leaf spring 17 yieldably urges one side of spool 16 into frictional engagement with an interior surface portion of magazine 15. More specifically it causes seating of the teeth or projections 15a, integrally formed on the interior surface of the magazine and arranged about a circle, into corresponding grooves or holes 16a formed in the side surface of spool 16 and also disposed about a circle. Teeth 15a when inserted in holes 16a serve as a brake to prevent rotation of spool 16 about its shaft when the magazine is removed from housing panel portion 1, or, more specifically, when the upper outside surface of the magazine 15, as illustrated, is spaced from the outside surface of panel 1. Such brake prevents accidental or unintended unwinding of the wire from the spool during times other than that of recording or reproducing. The brake arrangement also maintains the spool accurately centered in the magazine during such times so that when the magazine is moved against panel 1 the tapered portion 6 of the drive shaft will readily slip into the correspondingly tapered hole 16b formed in one side of spool 16.

As the magazine 15 is placed against the panel 1, teeth portions 8b either abut the side surface of the spool 16 or seat in corresponding holes formed in the side surface of the spool, the sleeve 8 moving upwardly against the action of spring 11 and the spool 16 moving downwardly against the action of leaf spring 17. The spring rates are so proportioned that the spool will be disengaged from the teeth 15a of the magazine with the teeth portions in the corresponding holes and the magazine fully seated against the panel 1. In this position the shaft tapered portion 6 fits loosely in the tapered hole 16b.

Any suitable clamping means (not shown) may be provided to firmly hold the magazine against the outer surface of panel 1. When the magazine is so clamped, as illustrated in the drawing, teeth portions 8b formed on the end of sleeve 8 will seat in corresponding holes formed on a side surface of spool 16, disposed about a circle at least as soon as rotation of the shaft 5 and sleeve 8 is begun. It will be noted that the spool is now suspended between two spring supports and thus floats. In other words, leaf spring 17 tends to push the spool upwardly, as illustrated, whereas spring 11 which yieldably urges collar 8 downwardly, as illustrated, is now compressed allowing collar 7 to move upwardly and causing movement of the spool downwardly and thereby overcoming the action of spring 17.

The terms "upwardly" and "downwardly" are used above merely to facilitate explanation of the device rather than to definitely describe how the magazine is mounted on the panel. Actually, the panel 1 may be upright or slightly inclined from an upright position to make the protruding drive shaft readily accessible to operating personnel.

Such spring suspension or floating mounting of the spools enables slight sidewise movement of the spools during winding or unwinding operation in recording or reproducing thus facilitates level winding of the wire since it automatically takes up and compensates for any small irregularities in the layers of wound wire and the like. Such floating suspension also eliminates noise that usually accompanies rotation of a member having appreciable side thrust against a rigid bearing.

In view of the above described construction it will be readily seen that the magazine-enclosed spool may be quickly moved into or out of operative relationship with the drive mechanism so as to readily couple or uncouple the spool from the drive shaft. Hence it is possible to change spools such as for inserting different recordings for reproduction as often as desired with very little effort and in the matter of about a second.

It will also be observed that due to the tapered construction of shaft portion 6 which fits into the correspondingly tapered hole 16b of the spool, self-centering of the spool will be effected and any tendency for the spool to wobble during rotation will be overcome. Furthermore, by the above described magazine drive, the pair of spool bearings normally fixed on the walls of the magazine is entirely eliminated hence greatly simplifying the magazine and making the spools readily detachable therefrom.

Thus it will be seen that I have provided a simple and inexpensive magazine drive arrangement particularly suitable for magnetic wire records for facilitating and enabling quick changing of the wire spools as often as desired, which incorporates self centering and aligning features as well as quiet operation.

While I have shown a particular embodiment of my invention, it will, of course, be understood that I do not wish to be limited thereto, since many modifications may be made, and I, therefore, contemplate by the appended claim to cover all such modifications as fall within the true spirit and scope of my invention.

I claim as my invention:

In a magnetic wire recording or reproducing device, a housing, a drive shaft projecting through an opening on a wall portion of said housing, a sleeve telescoped about said drive shaft in said housing, and having a collar portion and having teeth at one end thereof, spring means urging said collar portion into frictional engagement with an internal surface portion of said housing surrounding said opening, a magazine containing a spring supported spool which spool has an opening into which the end of said shaft fits when the magazine is clamped against said housing, a side surface of said spool surrounding said spool opening having grooves into which said teeth on said sleeve become seated when said magazine is so clamped thereby compressing said spring and removing said collar portion from said internal surface of said housing, and a pin and slot connection between said sleeve and shaft so that the sleeve will form a rigid coupling between said shaft and spool.

WALTER J. HALOSKI.

REFERENCES CITED

The following references are of record in the file of this patent:

UNITED STATES PATENTS

| Number | Name | Date |
|---|---|---|
| 1,665,784 | Hornauer | Apr. 10, 1928 |
| 1,802,598 | Goldberg | Apr. 28, 1931 |
| 1,928,106 | Koch et al. | Sept. 26, 1933 |
| 1,977,569 | Hineline | Oct. 16, 1934 |
| 2,032,213 | Howell | Feb. 25, 1936 |
| 2,126,299 | Wittel et al. | Aug. 9, 1938 |
| 2,401,632 | Greenleaf | June 4, 1946 |

FOREIGN PATENTS

| Number | Country | Date |
|---|---|---|
| 274,808 | Great Britain | Dec. 8, 1927 |